United States Patent [19]

Walters

[11] 3,981,441

[45] Sept. 21, 1976

[54] COUNTERS

[75] Inventor: John Benjamin Leslie Walters, Walsall, England

[73] Assignee: The Lucas Electrical Company Limited, Birmingham, England

[22] Filed: May 27, 1975

[21] Appl. No.: 580,721

[30] Foreign Application Priority Data

June 14, 1974 United Kingdom ............... 26435/74

[52] U.S. Cl. ................................ 235/103; 235/1 C; 235/95 R; 235/117 R; 235/144 SP

[51] Int. Cl.[2] ................... G01C 22/00; G06C 15/42

[58] Field of Search ............ 235/1 C, 95 R, 96, 103, 235/117 R, 144 DM, 144 SP, 133 R

[56] References Cited

UNITED STATES PATENTS 3,824,389 7/1974 Walters .......................... 235/117 R

FOREIGN PATENTS OR APPLICATIONS 2,061,927 6/1971 France ............................... 235/103

2,204,826 5/1974 France ............................... 235/103

*Primary Examiner*—Stanley J. Witkowski

*Attorney, Agent, or Firm*—Holman & Stern

[57] ABSTRACT

A counter comprises a body housing a set of discs which are freely rotatable on a sleeve and which have numerals on their peripheries. A series of drive plates are keyed to the sleeve and interleaved with the discs. At one end of the set of discs a spring-loaded collar also keyed to the sleeve urges the drive plates and discs into frictional engagement. The sleeve is rotatable with a reset wheel while the collar is driven by a star counting wheel through an orbital drive arrangement. The orbital drive arrangement may include a further collar having outwardly directed projections thereon which engage an abutment carried by a resilient arm, the abutment and projections restraining the further collar against rotation during counting. Each disc has a set of first abutments and a second abutment on its periphery. Spring blades engage the peripheries of the discs and have respective resilient stops thereon to engage the first abutments so as to oppose movement of the discs in a counting direction but to permit movement thereof in a reset direction. All the discs but one end disc are each provided with a resilient detent which is positioned in the path of movement of the second abutment. Each resilient detent is carried by the spring blade which mounts the resilient stop associated with an adjacent disc.

13 Claims, 6 Drawing Figures

COUNTERS

Figure 1:
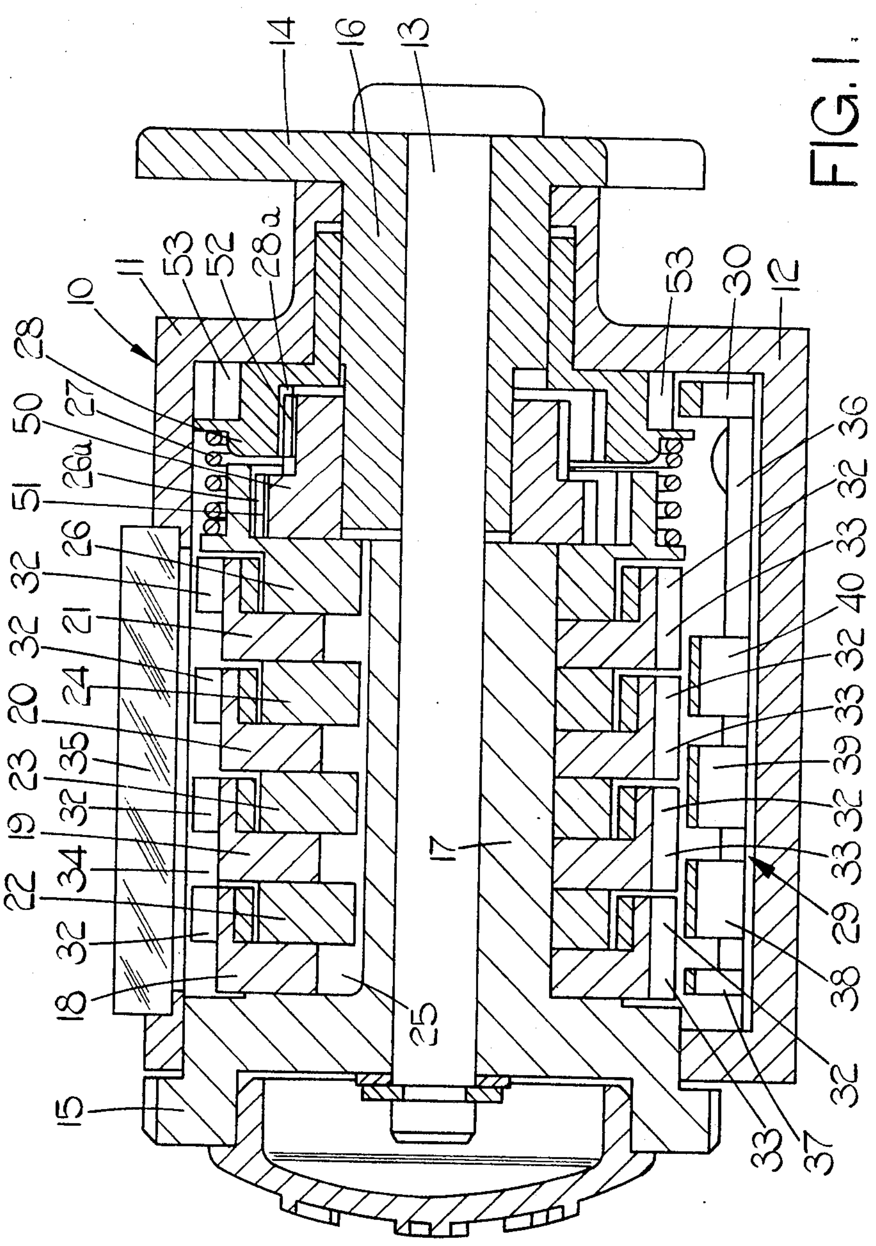

This invention relates to an improvement in or a modification of the counter described in our U.S. Pat. No. 3,824,389. In claim 1 of that application there is claimed a counter comprising a body, a set of co-axially disposed discs each having a plurality of numerals around the periphery thereof, a window in the body for displaying a numeral on each disc, friction drive means for frictionally rotating the discs, a rotary counting member for operating the friction drive means in a counting direction, a reset member for operating the frictional drive means in a reset direction, a plurality of first abutment means on each disc of the set except for one of the discs at one end of the set, the first abutment means being located between adjacent numerals on each disc, resilient stop means adapted to engage said first abutment means to prevent rotation of each disc of the set, except for the said one of the discs, in the counting direction but to allow rotation of said discs in the opposite or reset direction, a second abutment means on each disc of the set, and resilient detent means adapted to engage said second abutment means during rotation of each disc in the opposite reset direction, the resilient detent means for each disc, except for the disc at the opposite end of the set to said one of the discs, being arranged with the stop means of one adjacent disc so that, as one resilient detent means rides over its respective second abutment means, the stop means for the adjacent disc is moved out of engagement with one of the abutment means and thus permits the said adjacent disc to be indexed by the counting drive means until the stop means returns to engage the next abutment means in use.

In a preferred arrangement described in U.S. Pat. No. 3,284,389 each stop means is attached through the intermediary of a spring blade with the body, said spring blade overlying the resilient detent means of an adjacent disc so that riding movement of the detent means over its respective second abutment causes it to engage the spring blade and move the respective stop means out of engagement with one of the first abutment means.

In the above-mentioned U.S. Patent there is described a resilient stop assembly comprising a flange which is bolted to a shell portion of the counter, a series of four spring blades, and a series of three stop means integrally connected with respective free ends of three of the spring blades. The arrangement is such that each stop means is urged against a rim of its associated disc by its respective spring blade. Each stop means engages a portion of its associated rim which carries the first abutment means, and each spring blade engages a portion of its associated rim which carries the second abutment means.

There is also described in U.S. Pat. No. 3,824,389 resilient detent means including a flange carrying a series of four spring blades. The flange is mounted on the shell portion of the counter, in the same position as the flange of the resilient stop assembly, so that the spring blades of the resilient detent means are each disposed between a respective spring blade of the resilient stop assembly and its associated disc. The ends of the spring blades of the resilient detent means rest against respective portions of the rims of the discs on which are disposed the second abutments, and point in a direction opposite to that in which the stop means point.

According to the present invention, there is provided a counter as claimed in claim 1 of U.S. Pat. No. 3,824,389, wherein each stop means is mounted on a respective spring blade which is attached to the body, and each resilient detent means is mounted on the spring blade on which is mounted the stop means of an adjacent disc, the arrangement being such that riding movement of the detent means over its respective second abutment causes it to move the respective stop means out of engagement with one of the first abutment means.

Also according to the present invention, there is provided a counter as claimed in claim 7 of U.S. Pat. No. 3,824,389, wherein the orbital gear arrangement includes a further collar disposed between the body and said collar, said further collar having outwardly directed projections thereon, and an abutment portion mounted on a resilient arm, said resilient arm being attached to the body of the counter, said abutment portion being arranged to engage the projections on the further collar so as to prevent rotation of the further collar when said rotary counting member is rotated in the counting direction and to allow rotation thereof when said reset member is rotated in the reset direction.

Figure 2:
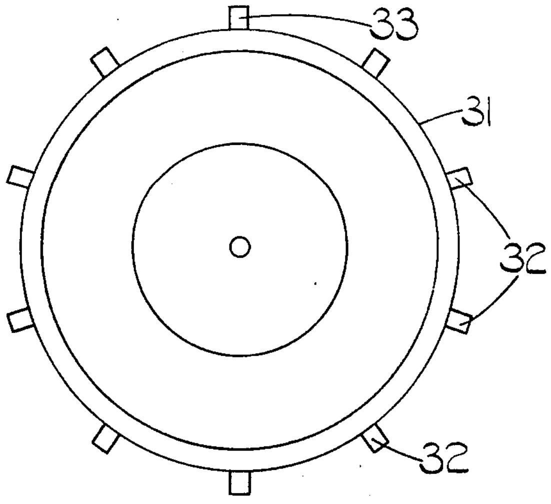
Figure 3:
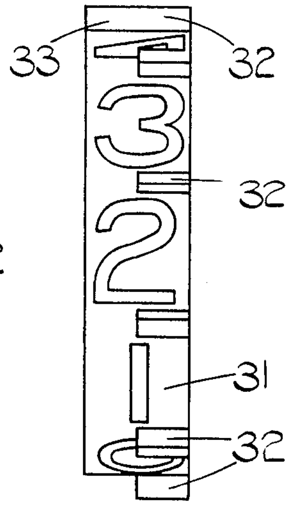
Figure 4:
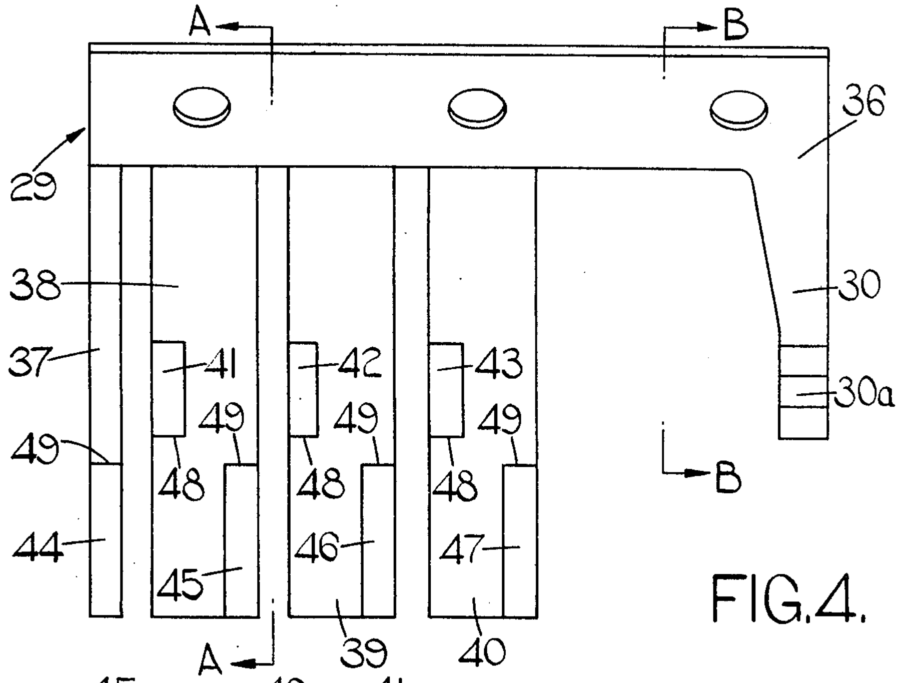
Figure 5:
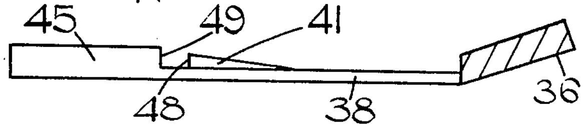
Figure 6:
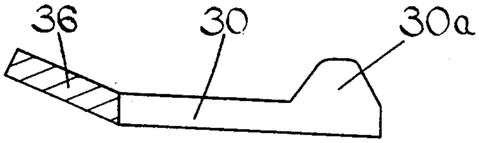

An embodiment of the present invention will now be described, by way of example, with reference to the accompanying drawings, in which:

FIG. 1 is a longitudinal sectional view of a counter according to the present invention, FIG. 2 is an end view of one of the discs of the counter shown in FIG. 1, FIG. 3 is a side view of the disc shown in FIG. 2, FIG. 4 is a plan view of a resilient retaining element, including resilient stop members and resilient retaining members, for use in the counter of FIG. 1, FIG. 5 is a section through the resilient retaining member if FIG. 4 taken along the line A—A and FIG. 6 is a section through the resilient retaining member of FIG. 4 taken along the line B—B.

The counter shown in the drawings is designed to be used on a bicycle or a stationary exercise machine simulating a bicycle to indicate a distance travelled by a user of the machine, notionaly or otherwise. As shown in FIG. 1, the counter comprises a composite body 10 formed of a top shell portion 11 and a bottom shell portion 12. A shaft 13 passes through the body 10 and freely mounts a star wheel 14, forming a counting drive, at one end thereof. The other end of the shaft freely mounts a rotatable reset wheel 15. The star wheel 14 and reset wheel 15 are provided with integral sleeves 16 and 17, respectively, which extend into the body 10 and are mounted on the shaft 13 to be rotatable thereon. Mounted on the sleeve 17 are a set of four discs 18, 19, 20 and 21 which are rotatable relative to the sleeve 17 but which can be frictionally driven thereby through the intermediary of drive plates 22, 23 and 24 keyed into a plurality of keyways 25 (only one shown) in the sleeve 17 and interleaved with the discs 18, 19, 20 and 21. Adjacent the disc 21, there is mounted a first collar 26 which is also keyed into the keyway 25 and, on one of its faces, abuts the disc 21. The other face of the collar 26 is engaged with one end of a spring 27 whose other end is engaged with a second collar 28 mounted on the sleeve 16 and abutting the body 10. The spring 27 provides the necessary axial force to enable friction drive of discs 18 to 21. The collar 26 is provided with a ring of inwardly directed teeth 26*a* which lie on a pitch circle whose center coincides with the axis of shaft 13. The sleeve 16 eccentrically mounts an annular member 50 for rotation relative thereto. The annular member 50 has two rings of outwardly directed teeth 51 and 52 engaging respectively with the teeth 26*a* on collar 26 and an inwardly directed ring of teeth 28*a* on collar 28. The rings of teeth 51 and 52 lie on respective larger and smaller pitch circles whose common axis is offset from the axis of shaft 13. Like teeth 26*a*, the ring of teeth 28*a* lie on a pitch circle whose center lies on the axis of the shaft 13. The collar 28 is provided on an outwardly directed face thereof with circumferentially spaced, integral chamferred projections 53 (only two shown).

Attached to the bottom shell portion 12 is a resilient retaining element 29, which will be described in greater detail at a later stage, and which is shown in detail in FIGS. 4 to 6. The resilient retaining element 29 is provided with a resilient arm 30 mounting an abutment portion 30*a* thereon. The abutment portion 30*a* is disposed in the path of movement of the projections 53 on the collar 28, as will be described further hereinafter.

The discs 18, 19, 20 and 21 can be rotated in a counting direction by rotation of the star wheel 14 and can be rotated in an opposite or re-set direction by rotation of the re-set wheel 15. Due to the frictional nature of the drive, it will be manifest that any one of the discs can be prevented from rotating, by holding it against rotation, without affecting the movement of the other discs.

Referring now particularly to FIGS. 2 and 3, each of the discs 18, 19, 20 and 21 are identical and comprise a peripheral rim 31 around which the numerals 0 to 9 are marked. Between each numeral there is provided a first abutment 32 which projects from the rim 31 and extends half-way thereacross. A second abutment 33 is formed as an extension of the first abutment 32 which is disposed between the numerals 4 and 5. It is to be noted that the arrangement of the second abutment 33 is such that when it is disposed adjacent the resilient retaining element 29 as will be described hereinafter, the numeral 0 appears in a window 34 in the top shell portion 11, the window 34 being covered by a lens 35.

Referring now to FIGS. 4, 5 and 6, the resilient retaining element 29 includes a flange 36 which is mounted on the bottom shell portion 12. In addition to the arm 30, the flange 36 has integrally attached thereto a series of four spring blades 37, 38, 39 and 40. A series of three stops 41, 42 and 43 are integrally mounted on intermediate portions of the blades 38, 39 and 40 respectively, and are offset to one side thereof. Each stop 41, 42, 43 is provided with an abutment surface 48. The stops 41, 42 and 43 are urged by the spring blades 38, 39 and 40 respectively against the rims 31 of respective discs 18, 19 and 20.

A series of four detent members 44, 45, 46 and 47 are integrally mounted on the free ends of spring blades 37, 38, 39 and 40 respectively. Each detent member 44, 45, 46, 47 is provided with an abutment surface 49. The detent members 45, 46 and 47 are each offset to a side of the respective spring blade 38, 39, 40 which is opposed to the side thereof on which the respective stop 41, 42, 43 is mounted. The detent members 44, 45, 46 and 47 are urged by the spring blades 37, 38, 39 and 40 respectively against the rims 31 of respective discs 18, 19, 20 and 21.

The resilient retaining element 29 is arranged such that each of the stops 41, 42 and 43 engages that portion of the rim 31 of its respective disc 18, 19, 20 which carries the first abutments 32, and each of the detent members 44, 45, 46 and 47 engages that portion of the rim 31 of the adjacent disc 18, 19, 20 and 21 respectively which carries the second abutment 33. The spring blades 37, 38, 39 and 40 project sufficiently far beyond their respective discs 18, 19, 20 and 21 that the detent members 44, 45, 46 and 47 present an inclined surface to the second abutments 33 on the discs 18, 19, 20 and 21 respectively during rotation thereof in a counting direction. It will be manifest from the above description that each detent member is mounted on the same blade as the stop associated with the adjacent disc.

The abutment surface 48 of each stop 41, 42, 43 and the abutment surface 49 of the respective detent member 44, 45, 46 on the adjacent spring blade 38, 39, 40 respectively are spaced longitudinally of the spring blades by an amount which is sufficient to allow the second abutment 33 and the first abutment 32 integral therewith on the respective disc 18, 19, 20 to be accommodated therebetween.

In use, the counter is mounted on the exercise machine or the bicycle (not shown) and is arranged so that the star wheel 14 is driven be pedals of the machine or by a wheel of the bicycle, as the case may be. Rotation of the star wheel 14 in the counting direction causes rotation of collar 26 through the intermediary of annular member 50 whose teeth 51 and 52 are respectively engaged with teeth 26*a* on collar 26 and teeth 28*a* on collar 28. The collar 28 is restrained against rotation by abutment of one of its projections 53 against abutment portion 30*a* on the arm 30 of the resilient retaining assembly 29. Abutting surfaces of the projection 53 and the abutment portion 30*a* are so arranged that the force required to cause the abutment portion 30*a* to ride over the projection 53 is greater than frictional forces between the discs 18, 19, 20, 21 and collar 26. Thus, the collar 28 is held against rotation rather than the collar 26.

Due to the fact that there are a different number of teeth 51 and 52 in the respective rings, rotational drive is imparted to the collar 26, the annular member 50 performing an orbital movement about the axis of shaft 13. Rotation of collar 26 causes a frictional drive to be imparted to the disc 21 which rotates so as to bring numerals 1 to 9 serially into the window 34 to give an indication of the notational distance travelled. During such rotation of the disc 21, the portion of the rim 31 upon which the first abutments 32 are not provided, slides past the detent member 47 and the discs 18, 19 and 20 are prevented from rotating due to the first abutments 32 thereon engaging the abutment surfaces 48 of stops 41, 42 and 43 respectively. The discs 18, 19 and 20 thus remain in positions in which the numerals zero appear in the window 34. As the numeral 9 on the disc 21 passes the window 34, the second abutment 33 on the disc 21 passes under the detent member 47. This causes lifting of the detent member 47, so as to ride over the second abutment 33, thereby lifting the spring blade 40 carrying the stop 43, so that the stop 43 is no longer engaged with its first abutment 32 on the disc 20. The disc 20 is thus permitted to rotate but rotation stops when the detent member 47 has ridden over the second abutment 33 on the disc 21 and has flexed back into its original position, thereby causing the spring blade 40 to flex back also to bring the stop 43 into a position in which it is engaged by the next first abutment 32 on the disc 20 so that the numeral 1 thereon appears and remains in the window 34. A similar operation occurs at the end of the next complete revolution of disc 21 so that the numeral 2 on the disc 20 appears in the window 34. This action continues until the numeral 9 on disc 20 is just passing out of the window 34. In this position, the detent member 47 lifted by the second abutment 33 on the disc 20, causes the spring blade 39 to flex. Flexure of the spring blade 39 causes the stop 42 to be removed from one of the first abutments 32 on disc 19 so that the latter is free to rotate until the numeral 1 thereon appears in the window 34. The stop 42 then moves back under the action of spring blade 39 to engage the next first abutment 32 on the disc 19 to ensure that the numeral 1 remains displayed in the window 34. The disc 18 is tripped in a similar manner to that described with reference to disc 19 after further rotation of the star wheel 14 in the counting direction. During this counting operation, the second collar 28 is restrained against rotation relative to body 10 by the abutment portion 30*a* on the arm 30 of the resilient retaining assembly 29.

When it is desired to reset the counter, it is merely necessary to rotate the rotatable reset wheel 15 in the opposite reset direction. Rotation of the reset wheel 15 causes rotation of annular member 50 about the axis of the pitch circles of teeth 51 and 52 due to engagement of teeth 51 with teeth 26*a* on collar 26. This, in turn, causes the collar 28 to rotate, due to engagement of teeth 28*a* with teeth 52 on the annular member 50. Rotation of the collar 28 is permitted because the projections 53 therein can be urged into abutment with the abutment portion 30*a* on the arm 30 of the resilient retaining member 29 with sufficient force to flex the arm 30 so that the projections 53 can slide past the abutment portion 30*a*. During counting, the forces tending to rotate the collar 28 are not sufficient to achieve this.

During rotation of the wheel 15, the first abutments 32 on the discs 18, 19 and 20 pass under the stops 41, 42 and 43 respectively, which, in this direction of rotation, do not prevent rotation of the disc but merely ride over the first abutment 32. However, in this direction of rotation, the detent members 44, 45, 46 and 47 are directed so as to prevent rotation of the disc 18, 19, 20 and 21 when the second abutments 33 are engaged with the abutment surfaces 49 thereof. Thus, the discs 18, 19 20 and 21 come to rest when the numerals zero appear in the window 34.

It will be appreciated from an examination of the drawings that all of the four discs 18 to 21 are identical. This facilitates production and assembly of such discs. Consequently, while all of the disc 18 to 21 are provided with first abutments 32, the first abutments 32 of disc 21 are never employed. Thus, disc 21, for purposes of operation of the counter, can be said to be provided without first abutments 32 and the first paragraph and claims of this Specification are to be construed accordingly.

It will be manifest from the above that the above described counter possesses considerable advantages over previous counters in that, at the most, only a single revolution of the reset wheel 15 is required in order to zero the counter; no gearing between the discs 18, 19, 20 and 21 is required; and no separate friction device is necessary to prevent 'over run' of the star wheel 14 at higher speeds.

In addition, because the stops 41, 42, 43 and the detent members 44, 45 and 47 are incorporated into a single element, the above described counter is easier to assemble than the counter described in U.S. Pat. No. 3,824,389.

I claim:

1. A counter comprising a body, a set of co-axially disposed discs, a plurality of numerals around a periphery of each said disc, a window in said body for displaying a numeral on each disc, friction drive means for frictionally rotating said discs, a rotary counting member for operating said friction drive means in a counting direction, a reset member for operating said friction drive means in a reset direction, a plurality of first abutment means on each said disc of said set except for one of said discs at one end of said set, said first abutment means being disposed between adjacent numerals on each said disc, a plurality of resilient stop means each adapted to engage first abutment means on a respective one of said discs, except for said one of said discs at one end of said set, to prevent rotation of said respective one of said discs in the counting direction but to allow rotation of said discs in the opposite or reset direction, a second abutment means on each said disc of said set, and a plurality of resilient detent means respectively adapted to engage said second abutment means on each of said discs so as to allow rotation of said discs in the counting direction but to stop said discs at a predetermined point of their rotation in said opposite reset direction, and a spring blade serving to attach each said stop means to said body, wherein the improvement comprises each said resilient detent means is mounted on the spring blade on which is mounted said stop means of an adjacent disc, the arrangement being such that riding movement of each said detent means over its respective second abutment means causes it to move the respective stop means out of engagement with one of said first abutment means on said adjacent disc.

2. The counter according to claim 1, wherein said first abutment means are formed on said periphery of each said disc to extend partially there across.

3. The counter according to claim 1, wherein said second abutment means is formed as an extension of one of said first abutment means on each said disc.

4. The counter according to claim 1, wherein said friction drive means includes a rotatable sleeve, a plurality of drive plates mounted for rotation with said sleeve and interleaved with said discs, and means resiliently biassing said discs and said drive plates into frictional engagement.

5. The counter according to claim 4, wherein said biassing means comprises a collar mounted for rotation with said sleeve and abutting one of said discs at the end of said set of discs, and a spring disposed between said body and said collar.

6. The counter according to claim 5, wherein said rotary counting member is arranged to drive said collar through the intermediary of an orbital gear arrangement.

7. The counter according to claim 6, wherein said orbital gear arrangement includes a further collar disposed between said body and said collar, outwardly directed projections on said further collar, an abutment portion, and a resilient arm serving to attach said abutment portion to said body of said counter, said abutment portion being arranged to engage said outwardly directed projections on said further collar so as to prevent rotation of said further collar when said rotary counting member is rotated in the counting direction and to allow rotation thereof when said reset member is rotated in the reset direction.

8. The counter according to claim 6, wherein said reset member is arranged to rotate said sleeve, and said orbital gear arrangement is arranged to permit rotation of said collar in the reset direction.

9. A counter comprising a body; a set of co-axially disposed discs; a plurality of numerals around a periphery of each said disc; a window in said body for displaying a numeral on each said disc; friction drive means for frictionally rotating said discs, said friction drive means including a rotatable sleeve, a plurality of drive plates mounted for rotation with said sleeve and interleaved with said discs, a collar mounted for rotation with said sleeve and abutting one of said discs at an end of said set of discs, and a spring disposed between said body and said collar resiliently biassing said discs and said drive plates into frictional engagement; a rotary counting member for operating said friction drive means in a counting direction; a reset member for operating said friction drive means in a reset direction; a plurality of first abutment means on each said disc of said set except for one of said discs at one end of said set, said first abutment means being disposed between adjacent numerals on each said disc; a plurality of resilient stop means each adapted to engage said first abutment means on a respective one of said discs, except for the said one of said discs at one end of said set, to prevent rotation of said respective one of said discs in the counting direction but to allow rotation of said discs in the opposite or reset direction; a second abutment means on each said disc of said set; a plurality of resilient detent means each adapted to engage said second abutment means on a respective one of said discs during rotation of that disc in the opposite reset direction; said resilient detent means for each said disc, except for the disc at the opposite end of said set to said one of said discs, being arranged with said stop means of an adjacent one of said discs so that, as one resilient detent means rides over its respective second abutment means, the stop means for said adjacent one of said discs is moved out of engagement with one of said first abutment means and thus permits the said adjacent one of said discs to be indexed by said counting drive means until said stop means returns to engage the next first abutment means in use; and an orbital gear arrangement through which said rotary counting member drives said collar, said orbital gear arrangement including a further collar disposed between said body and said collar, wherein the improvement comprises outwardly directed projections are provided on said further collar, and an abutment portion is mounted on a resilient arm, said resilient arm serving to attach said abutment portion to said body of said counter, said abutment portion being arranged to engage said outwardly directed projections on said further collar so as to prevent rotation of said further collar when said rotary counting member is rotated in the counting direction and to allow rotation thereof when said reset member is rotated in the reset direction.

10. The counter according to claim 9, wherein said first abutment means are formed on said periphery of each said disc to extend partially there across.

11. The counter according to claim 9, wherein said second abutment means is formed as an extension of one of said first abutment means on each said disc.

12. The counter according to claim 9, wherein a spring blade serves to attach each said stop means to said body, said spring blade overlying said resilient detent means of an adjacent disc so that riding movement of said detent means over its respective second abutment causes it to engage said spring blade and move the respective stop means out of engagement with one of said first abutment means on said adjacent disc.

13. The counter according to claim 9, wherein said reset member is arranged to rotate said sleeve, and said orbital gear arrangement is arranged to permit rotation of said collar in the reset direction.

* * * * *